May 1, 1962 M. L. SHANNON 3,031,788
FISHING TACKLE
Filed March 31, 1959
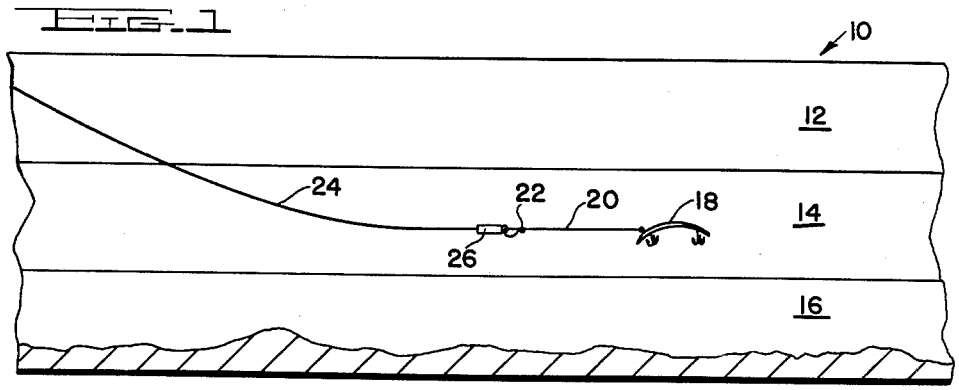
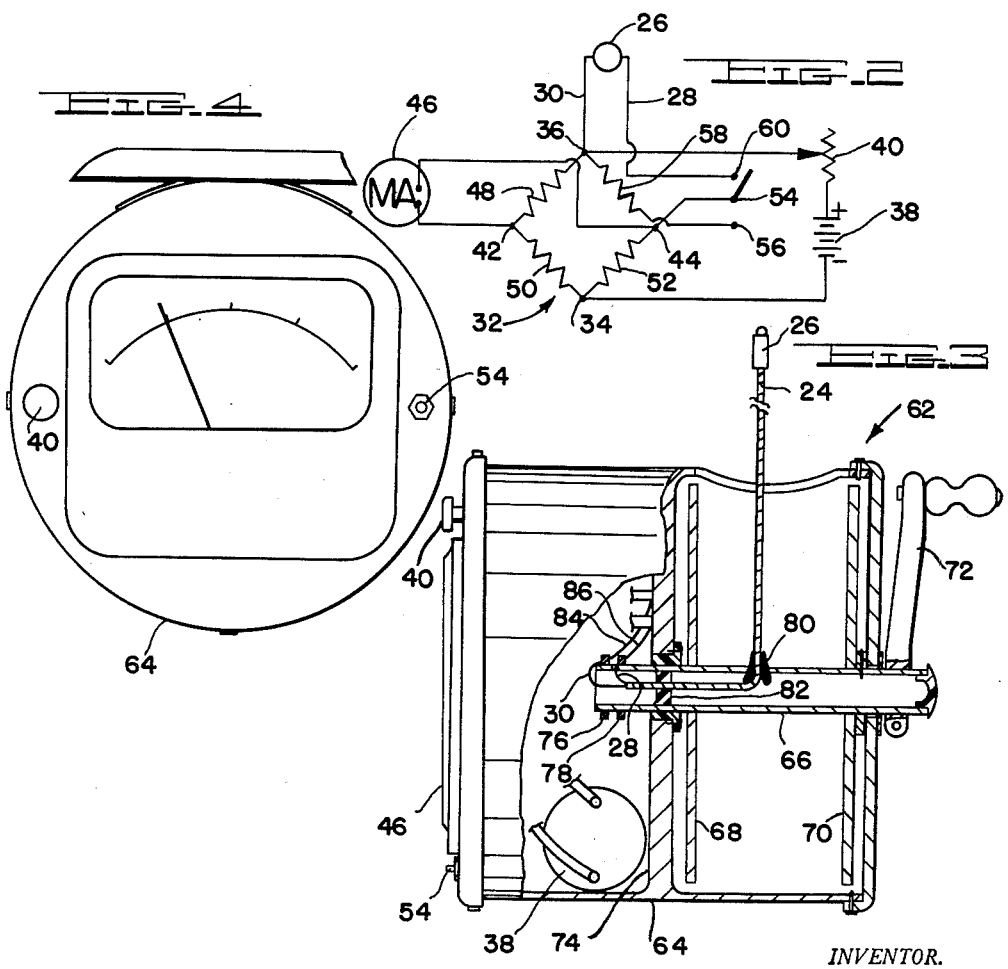
INVENTOR.
MELVIN L. SHANNON
BY
FINN G. OLSEN
ATTORNEY – # United States Patent Office 3,031,788
Patented May 1, 1962

3,031,788
FISHING TACKLE
Melvin L. Shannon, 3425 Beaumont, Dixboro, Mich.
Filed Mar. 31, 1959, Ser. No. 803,234
4 Claims. (Cl. 43—4)

The present invention relates to fishing tackle, and more particularly to fishing tackle having electrical elements which are thermally sensitive to indicate the temperature and thereby the depth of water in which the most favorable fishing conditions will occur.

In order to better understand the present invention, it is believed it will be helpful if a brief description is given of temperature conditions as they normally exist in lakes where fishing occurs. As is well known, water in lakes reaches its maximum density at about 39.2° F. In springtime, in the colder climates, a condition will exist for a short period of time when the temperature of the water in the lake is approximately 39.2° F. from top to bottom. Thereafter, as the sun continues to warm the surface waters, such surface waters become lighter than the waters underneath and thus, the warmer and lighter waters stay on the top and no further mixing occurs with waters which lie below.

With the warming of the surface waters, deep lakes become divided into three layers, each with different temperature ranges. The warmer water being lighter, stays on the top. The cold water being heavier, remains at the bottom. In between these warm and cold layers is a relatively thin dividing layer of water known as a thermocline, separating the warm water above from the cold water below. In summertime, there is relatively little vertical movement of the water in a lake, this being a period of stagnation which exists until the cold weather sets in at wintertime.

In their constant attempt to find water conditions which are to their liking, game fish will usually not live in the upper warm waters, known as the epilimnion, and they will not live in the lower cold layer, known as the hypolimnion, because this layer may be lacking in sufficient oxygen and food. It has been discovered that the fish will be found in the region of the thermocline which may be defined as the layer or zone where the drop in temperature is at least one degree centigrade per meter of depth, because the thermocline contains the most favorable conditions of temperature, oxygen and food supply. It has also been discovered that these conditions usually are more favorable nearer the top level of the thermocline, or immediately above it, and therefore, this is where the fisherman will find best summer fishing in the larger lakes. Thus, trolling at the point where the thermocline intercepts the bottom of the lake should produce the best deep water fishing. Until recent years, the fisherman have scoffed at the logic or inconvenience of considering water temperatures as an aid to good fishing. However, studies are now beginning to show that the temperature factor is one of the vital aids in finding fish, regardless of the time of the year.

Accordingly, it is an object of the present invention to provide fishing tackle to indicate the temperature and thereby the depth of the water in which the most favorable fishing conditions are apt to be found.

It is another object of the present invention to provide fishing tackle of the foregoing character wherein the fisherman can detect temperature changes of the water in which he is fishing continuously during the fishing operation.

It is another object of the present invention to provide fishing tackle of the foregoing character wherein the fisherman can ascertain the temperature of the water in which his fish lure is located, and he can feed out or feed in his fishing line so as to place his fish lure in water of the proper temperature and thereby, in the proper depth of water.

It is still another object of the present invention to provide fishing tackle of the foregoing character wherein the fishing line is formed from two electrical conductors and a temperature sensitive electrical element is connected in series with said conductors and is positioned adjacent the fish lure so that the fisherman may use this line in conjunction with electrical apparatus for ascertaining the exact temperature at the level of water in which his fish lure is located.

It is still another object of the present invention to provide fishing tackle of the foregoing character wherein the electrical components for ascertaining the temperature at the water level of the temperature sensitive element are contained in a unitary housing to which the fishing line is connected.

It is still another object of the present invention to provide fishing tackle of the foregoing character wherein the housing is an integral part of a fishing reel, said fishing reel and housing being constructed and arranged so as to permit the line to be wound on the reel and to provide electrical connections from the line to the electrical components in the housing.

It is still another object of the present invention to provide fishing tackle of the foregoing character wherein means are provided for calibrating the electrical components at any time during the normal use of the fishing tackle.

Other objects of this invention will appear in the following description and appended claims, reference being had to the accompanying drawings forming a part of this specification wherein like reference characters designate corresponding parts in the several views.

In the drawings:

FIGURE 1 is a fragmentary view of a fish trolling operation taking place with a fish lure located in the thermocline of a body of water;

FIGURE 2 is a schematic wiring diagram illustrating the electric circuit that may be used in one embodiment of the present invention;

FIGURE 3 is a top plan view partly in section of a fishing reel embodying one form of the present invention; and FIGURE 4 is a side elevation of the fishing reel viewed from the left side of FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed heren is for the purpose of description and not of limitation.

Referring now to the drawing, the invention will be described in greater detail. For the purpose of describing the invention, a body of water 10 has been illustrated in FIGURE 1, showing an upper layer or epilimnion 12, and intermediate layer or thermocline 14, and a lower layer or hypolimnion 16, and it should be understood that the relative depth of the three layers in this figure is not necessarily according to scale.

Being pulled in the thermocline 14 is the fish lure 18. The latter has a leader 20 which is attached at 22 to the end of the fishing line 24. Also connected to the end of the fishing line 24 is a thermally sensitive resistor or thermistor 26. The fishing line 24 is formed from two electric conductors 28 and 30 which are connected in series with the thermally sensitive resistor or thermistor 26, as can be seen in FIGURE 2.

As is well known, thermistors are thermally sensitive resistors for the automatic detection, measurement and control of physical energy. They are electronic semi-conductors whose electrical resistance varies with temperature and lies between that of conductors and insulators, and thermistors are characterized by their extreme sensitivity to relatively minute temperature changes.

In the present invention, the thermistor 26 is positioned adjacent the fish lure 18 and will be able to indicate the general location of the upper surface of the thermocline 14. As was previously indicated, there is a marked change in temperature between the epilimnion and the thermocline 14, and, because of the presence of this temperature change, the thermistor 26, which is extremely sensitive to relatively minute temperature changes, may be used to detect when the fish lure enters and departs from a level of water where this temperature change occurs.

One arrangement for doing this is illustrated schematically in FIGURE 2. As there shown, an electrical bridge 32 is shown having input terminals 34 and 36. Connected across these terminals 34 and 36 is a battery or other suitable source of electric power 38, and in series with the source of electric power 38 is a potentiometer 40. The bridge 32 has a pair of output terminals 42 and 44 across which is connected a milliammeter 46. Resistors 48, 50 and 52 form three arms of the bridge 32, and the latter has for the fourth arm a single pole, double throw switch 54 which is connected to the terminal 44 and has its one contact 56 in series with the resistor 58 which is connected to the terminal 36. The other contact 60 of the switch 54 is in series with the one conductor 28, the thermistor 26 and the other conductor 30, with the latter also being connected to the terminal 36. In the normal operation of the present invention, the switch 54 will be closed through the contact 60, thereby inserting the two conductors 28 and 30 and the thermistor 26 into the bridge 32 as one arm thereof.

When the switch 54 is in its normally closed position with respect to contact 60, the thermistor 26 can be raised and lowered between different temperature levels of water so as to vary the electrical resistance of the thermistor 26 which will have the effect, in the conventional manner, of indicating on the milliammeter 46 different rates of current flow between the terminals 42 and 44. Thus, by observing the milliammeter 46, the fisherman can readily ascertain when his fish lure 18 has descended from the epilimnion 12 into the thermocline 14, and in order to assure himself of the best success in a trolling operation, he can regulate the speed of his boat and the length of fishing line 24, which he has feed out, so as to maintain his fish lure 18 at the level providing optimum fishing conditions.

On occasions, it will be necessary to recalibrate or adjust the setting of the milliammeter 46 and for this purpose the switch 54 may be closed through the contact 56, thereby placing the resistor 58, having a fixed known resistance, into the bridge 32, and the fisherman can then adjust the setting of the milliammeter 46 by means of the potentiometer 40. After this has been done, the switch 54 may be closed again with respect to contact 60 and the milliammeter 46 will again register readings indicating the ambient temperature at the thermistor 26. Such calibrations may be required, for example, at periodic intervals as the electrical characteristics of the various electrical components change from continuous use.

Referring now to FIGURES 3 and 4, a brief description will be given of one type of reel that may be used in an embodiment of the present invention. As there shown, the reel 62 has a housing 64 in which is rotatably mounted the hollow shaft 66 on which are mounted the annular discs 68 and 70. A crank 72 is connected to the outer end of the hollow shaft 66 for rotating the latter so that the line 24 can be reeled in or reeled out of the housing 64.

The shaft 66 is journaled near its inner end in the interior partition 74 and has on its inner end a pair of slip-rings 76 and 78. The line 24 extends through the sealed opening 80 in an intermediate portion of the hollow shaft 66 and then extends inwardly through a sealing member 82 to a position where the electric conductors 28 and 30 can be connected to the slip-rings 76 and 78. A pair of brushes 84 and 86 are adapted to make electrical contact with the slip-rings 76 and 78 so that the electrical conductors 28 and 30 will remain in a closed circuit in the bridge 32, irrespective of whether the line 24 is being reeled in or out of the housing 64. For the purpose of simplifying the drawing, the various details of the electrical components positioned within the housing 64 have been omitted from FIGURE 3 or shown only fragmentarily, but it is to be understood that the various electrical components with the exception of the thermistor 26 will be found within the housing 64 to the left side of the partition 74. Also, the switch 54 can be controlled from a position externally of the housing 64 from the positions illustrated in FIGURES 3 and 4. Likewise, the means for controlling the potentiometer 40 also is located on the external surface of the housing 64.

From the foregoing it will be understood that a very simple device has been disclosed which will enable fishermen to locate the proper temperature level at which they should carry on their fishing operations, thereby assuring them the most satisfactory results.

Having thus described my invention, I claim:

1. Fishing tackle comprising a fishing line formed of two electrical conductors, a thermistor operatively connected to said conductors at one end of said line, a fish lure attached to the one end of said line, an electrical circuit electrically connected to the other end of said line and including a power source, an instrument for indicating the rate of current flow through said thermistor and thereby the ambient temperature at said thermistor and switch means for substituting selectively a resistor of fixed resistance in said circuit in place of said conductors and thermistor for the purpose of calibrating said instrument, and means for feeding out and feeding in said line.

2. Fishing tackle comprising a line formed of two electrical conductors, a thermally sensitive resistor operatively connected to said conductors at one end of said line, a reel, said line being attached on the other end on said reel for reeling out and reeling in said line, said reel including a housing into which the other end of said line extends, said housing containing an electrical bridge circuit, said bridge circuit including a pair of input terminals, a pair of output terminals, a source of electric power and a potentiometer in series connected across said pair of input terminals, a milliammeter connected across said pair of output terminals, and a double throw switch forming one arm of said bridge with one contact in series with a resistor of fixed resistance and the other contact in series with said conductors and said thermally sensitive resistor so that the milliammeter will indicate the ambient temperature at the thermally sensitive resistor when the switch is closed with the one contact and the milliammeter can be calibrated by use of the potentiometer when the switch is closed with the other contact.

3. Fishing tackle as claimed in claim 2 wherein said reel has a hollow shaft on which said line is adapted to be wound, said shaft having a hole intermediate its ends through which said other end of said line passes, and one end of said shaft projects into said housing and carries therein a pair of slip-rings electrically connected to said bridge, said conductors in said line also being connected to said slip-rings.

4. Fishing tackle comprising a fishing line formed of two electrical conductors, a fish lure attached to one end of said line, an electrical element operatively connected to said electrical conductors adjacent said fish lure and responsive to ambient temperature to control the electrical current flow through said conductors, an electrical circuit electrically connected to the other end of said line and including a power source, an instrument for indicating the rate of current flow through said electrical element and thereby the temperature of the water in which said lure is located, and means for feeding out and feeding in said line.

References Cited in the file of this patent

UNITED STATES PATENTS

| 726,020 | Bryan | Apr. 21, 1903 |
| 2,316,942 | Doll | Apr. 20, 1943 |
| 2,818,482 | Bennett | Dec. 31, 1957 |

FOREIGN PATENTS

| 275,036 | Great Britain | Aug. 4, 1927 |

OTHER REFERENCES

Popular Mechanics, page 111 of the September 1950 issue.